United States Patent [19]

Hirayama

[11] 3,975,060
[45] Aug. 17, 1976

[54] FLUID PRESSURE CONTROL DEVICE WITH A FAILURE ALARM FOR A VEHICLE BRAKE SYSTEM

[75] Inventor: Itaru Hirayama, Ueda, Japan

[73] Assignee: Nisshin Kogyo Kabushiki Kaisha, Ueda, Japan

[22] Filed: May 14, 1975

[21] Appl. No.: 577,787

[30] Foreign Application Priority Data
May 18, 1974  Japan.............................. 49-55730

[52] U.S. Cl............................ 303/6 C; 188/151 A; 188/349; 200/82 D; 303/84 A
[51] Int. Cl.² ...................... B60T 8/26; B60T 17/22
[58] Field of Search ................ 303/6 C, 6 R, 84 A; 188/151 A, 349, 345; 200/82 D, 82 R; 340/52 C

[56] References Cited
UNITED STATES PATENTS

| | | | |
|---|---|---|---|
| 3,427,582 | 2/1969 | Brandon, Jr. ...................... | 303/84 A |
| 3,441,318 | 4/1969 | Bueler........................... | 303/84 A X |
| 3,450,443 | 6/1969 | Bueler........................... | 303/84 A X |
| 3,459,000 | 8/1969 | Oberthur............................ | 303/6 R |
| 3,672,732 | 6/1972 | Green ............................... | 303/84 A |
| 3,700,286 | 10/1972 | Bueler........................... | 303/82 A X |
| 3,708,211 | 1/1973 | Bueler.............................. | 303/6 C |
| 3,738,709 | 6/1973 | Stokes................................ | 303/6 C |

Primary Examiner—George E. A. Halvosa
Assistant Examiner—Douglas C. Butler
Attorney, Agent, or Firm—Haseltine, Lake & Waters

[57] ABSTRACT

In a brake system including two independent hydraulic lines extending from a dual type brake master cylinder and connected to the respective rear wheel brakes, a novel pressure control device provided for automatically adjusting the ratio of the front to the rear wheel brake pressure for maximized overall braking efficiency and including failure alarm for warning the driver of any trouble in operation of the device or of any fluid leakage on the hydraulic lines without delay. The device includes a cylinder bore fitted with a pair of annular pistons and a balance piston extending axially therethrough. A pair of sealing rings are mounted on the balance piston at the opposite ends thereof to define each an input and an output hydraulic chamber, respectively connected with the upstream and downstream portions of the associated one of the two hydraulic lines and adapted to be placed in communication with each other with displacement of the balance piston from its neutral position. A pair of control valves are arranged each between the adjacent input and output hydraulic chambers and operable normally to reduce the fluid pressure in the output chamber relative to that in the input chamber at a predetermined ratio. The balance piston when moved in either direction from its neutral position actuates a switch unit inserted in an electrical alarm circuit.

1 Claim, 5 Drawing Figures

FLUID PRESSURE CONTROL DEVICE WITH A FAILURE ALARM FOR A VEHICLE BRAKE SYSTEM

BACKGROUND OF THE INVENTION

This invention relates generally to brake systems for automotive vehicles of the type including a dual type brake master cylinder associated with two mutually independent hydraulic lines and more particularly to fluid pressure control devices for such brake systems which include a brake failure alarm.

As is well known, in one form of brake system of the type described above, the first and second hydraulic lines, extending from the respective outlet ports of the dual type brake master cylinder, are connected to the brake chambers in respective pairs of wheels, each including a front and a rear wheel lying on the opposite sides of the vehicle. In a modification of this form of brake system, the front wheel brakes are each formed with two hydraulic chambers connected, respectively, with the first and second hydraulic lines.

SUMMARY OF THE INVENTION

The present invention has for its object the provision of a fluid pressure control device for use in a vehicle brake system of the type described and which is designed to afford improved overall braking efficiency and driving safety.

According to the present invention, there is provided a fluid pressure control device with a failure alarm, of the character described, which includes means for automatically adjusting the ratio of hydraulic pressure between the front and rear wheel brakes to such a predetermined value as to maximize the overall braking efficiency and which also includes means for automatically warning the driver of any possible failure in the pressure adjusting means or any fluid leakage possibly occurring in either of the first and second hydraulic lines of the brake system.

The above and other objects, features and advantages of the present invention will become apparent from the following description when taken in conjunction with the accompanying drawings.

BRIEF DESCRIPTION OF THE DRAWINGS

In the drawings, which illustrates a few preferred embodiments of the present invention.

DESCRIPTION OF THE PREFERRED EMBODIMENTS

Figure 1:
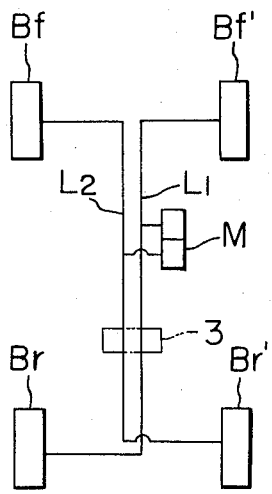
FIG. 1 is a schematic diagram illustrating the general arrangement of a preferred embodiment of the invention.

Referring to FIG. 1, there is shown a vehicle brake system embodying the present invention and which includes a first and a second hydraulic fluid line, $L_1$ and $L_2$, respectively, extending from the two output ports of a dual type brake master cylinder M and connected to the respective pairs of front and rear wheel brakes, $Bf'$, $Br$ and $Bf$, $Br'$, lying on the opposite sides of the vehicle.

Figure 2:
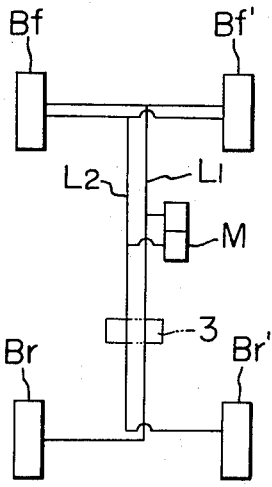
FIG. 2 is a diagram similar to FIG. 1, illustrating another embodiment of the invention.

FIG. 2 illustrates another brake system embodying the present invention and in which each of the front wheel brakes $Bf$ and $Bf'$ includes two hydraulic chambers, respectively, connected with the first and second brake lines $L_1$ and $L_2$.

In both of these figures, reference numeral 3 indicates the casing of the device of the invention, which is arranged, as shown, across the first and second hydraulic lines $L_1$ $L_2$ at an appropriate location between the brake master cylinder M and the rear wheel brakes $Br$ and $Br'$.

Figure 3:
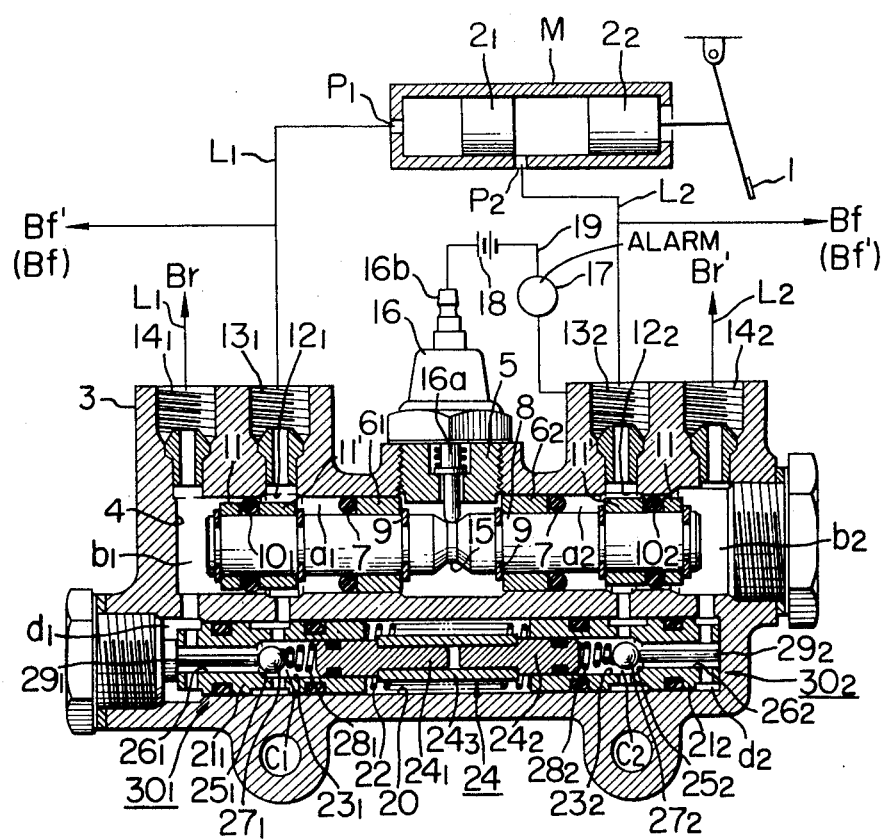
FIG. 3 is a partly schematic cross-sectional plan view of the essential parts of the device shown in FIGS. 1 and 2.

Referring to FIG. 3, the dual type brake master cylinder M is of known tandem structure, including an integral piston assembly comprised of a pair of front and rear pistons $2_1$ and $2_2$, which are operable upon actuation of a brake pedal 1 to feed the first and second hydraulic lines $L_1$ and $L_2$ with pressure oil or other fluid, respectively, through a first and a second output port $P_1$ and $P_2$ of the brake master cylinder M.

The casing 3 of the fluid pressure control device of the present invention has defined therein a cylinder bore 4 closed at the opposite ends and in which bore a pair of first and second annular pistons $6_1$ and $6_2$ are slidably fitted on the opposite sides of a position defining member 5, which is fitted in the wall of the casing 3 so as to properly extend into the central portion of cylinder bore 4. Also fitted in the cylinder bore 4 are a pair of annular sealing members 7 which lie on the outer end faces of the respective annular pistons $6_1$ $6_2$. A balance piston 8 is slidably fitted through the annular pistons and displaceable within the cylinder bore 4 in either axial direction over a predetermined distance. A pair of left and right abutment rings 9 are secured to the central portion of the balance piston 8 for abutting engagement with the respective annular pistons $6_1$ and $6_2$.

Mounted on the opposite end portions of the balance piston 8 are a pair of first and second annular sealing members $10_1$ and $10_2$ each of which is held fixed on the balance piston 8 by a pair of retainer rings 11 and 11'. With the balance piston 8 normally held in its neutral position as shown, the sealing members $10_1$ and $10_2$ are in sealing engagement with the adjacent wall of the cylinder bore 4 to define therein first hydraulic chambers $a_1$, $b_1$ and second hydraulic chambers $a_2$, $b_2$, respectively, in cooperation with the annular pistons $6_1$, $6_2$ and the opposite end walls of the cylinder bore 4. It is to be noted, however, that, in the event the balance piston 8 is moved to the left or right limit of its range of axial sliding movement, one of the sealing members, $10_1$ or $10_2$, which lies on the side opposite to the direction of the sliding movement of the balance piston 8, is placed opposite to an annular groove $12_1$ or $12_2$ formed in the adjacent wall of the cylinder bore 4 to cease its sealing function.

As shown, the first and second hydraulic chambers $a_1$ and $a_2$ are connected to the upstream portions of the respective first and second hydraulic lines $L_1$ and $L_2$, respectively, through first fluid inlet and outlet ports $13_1$, $14_1$ formed in the casing 3 while the first and second hydraulic chambers $b_1$ and $b_2$ are connected to the downstream portions of the respective first and second hydraulic lines $L_1$ and $L_2$, respectively, through second fluid inlet and outlet ports $13_2$, $14_2$ formed in the casing 3.

The balance piston 8 is formed around the periphery of its central portion with an annular groove 15 to receive therein the tip of a switch actuator rod 16a of a switch unit 16, which is fitted to the position defining member 5, as long as the balance piston 8 is in its neutral position, as shown. The switch unit 16 includes normally open contacts arranged so as to be closed when the actuator rod 16a is forced out of the annular groove 15 as the balance piston 8 is moved from its neutral position to the right or left. An electrical alarm circuit 19 is formed between the terminal 16b of switch unit 16 and the casing 3, including an alarm 17 such as a lamp or buzzer and a voltage source 18.

Also formed in the casing 3 is a separate cylinder bore 20 which is parallel with the cylinder bore 4 described above and also closed at the opposite ends. A first and a second control piston $21_1$ and $21_2$, of the same diameter, are slidably fitted in the second cylinder bore 20 with a coiled pressure setting spring 22 arranged under compression between the two control pistons $21_1$ and $21_2$. The control pistons $21_1$ and $21_2$ are each formed in the inner end face thereof with an axial bore $23_1$ or $23_2$ to slidably receive the respective end portions of another balance piston 24, which are equal in diameter to each other. The axial bores $23_1$ and $23_2$ are formed so as to define therein first and second input fluid chambers $c_1$ and $c_2$, respectively, which are at all times in fluid communication with the first and second upstream hydraulic chambers $a_1$ and $a_2$, respectively. Also, defined in the opposite end portions of the cylinder bore 20 are first and second output fluid chambers $d_1$ and $d_2$ which are at all times in fluid communication with the first and second downstream hydraulic chambers $b_1$ and $b_2$.

As shown, the control pistons $21_1$ and $22_2$ are formed in the outer end walls with respective oil passage holes $26_1$ and $26_2$ which communicate with the adjacent first and second output fluid chambers $d_1$ and $d_2$, respectively, and open into the respective axial bores $23_1$ and $23_2$. The annular end walls of axial bores $23_1$ and $23_2$ are formed to serve as a valve seat $25_1$ or $25_2$ engageable with a ball valve element $27_1$ or $27_2$, which is accommodated in the axial bore $23_1$ or $23_2$, respectively. Biasing springs $28_1$ and $28_2$ are arranged in the respective axial bores $23_1$ and $23_2$ to urge the ball valve elements $27_1$ and $27_2$ in a closing direction. Extending through the respective oil passage holes $26_1$ and $26_2$ are valve opening rods $29_1$ and $29_2$ which are provided on the opposite end walls of the cylinder bore 20 to project axially inwardly therefrom. The valve opening rods $29_1$ and $29_2$ are each intended to serve the purpose of holding the adjacent ball valve $27_1$ or $27_2$ in its open position when the associated control piston $21_1$ or $21_2$ is moved within the cylinder bore 20 to the outermost position.

It is to be noted that the above recited component parts in the cylinder bore 20 together consititute a first and a second control valve $30_1$ and $30_2$ which are each operable normally to reduce the fluid pressure in the associated downstream hydraulic chamber $b_1$ or $b_2$ relative to that in the adjacent upstream hydraulic chamber $a_1$ or $a_2$ at a predetermined ratio.

Though the balance piston 24 in the embodiment illustrated takes the form of an assembled unit comprised of a pair of left and right piston sections $24_1$ and $24_2$ with a tubular joint section $24_3$ fitted at the opposite ends over the inner end portions of the piston sections $24_1$ and $24_2$, it may be formed as an integral unit, if desired.

Description will next be made of the operation of the embodiment described above with reference to FIG. 3, in which the device is shown in a normal state with the brake master cylinder M left de-energized. As observed, the first and second annular piston $6_1$ and $6_2$ are in their inner extreme position defined by the position defining member 5 and the balance piston 8 in its neutral position. The first and second control pistons $21_1$ and $21_2$ are in their outer extreme position under the bias of pressure setting spring 22 so that the first and second input fluid chambers $c_1$ and $c_2$ are in communication with the first and second output fluid chambers $d_1$ and $d_2$, respectively.

Now assuming that the brake pedal 1 is actuated, the output fluid pressure of brake master cylinder M is transmitted through the first and second hydraulic lines $L_1$ and $L_2$ to the downstream ends thereof so that the front and rear wheel brakes Bf, Bf' and Br, Br' are all operated simultaneously. As the output fluid pressure of the brake master cylinder M rises, the pressure in the input and output fluid chambers $c_1$, $c_2$ and $d_1$, $d_2$ rises to a predetermined level, when a pressure differential acting upon each of the control piston $21_1$, $21_2$ due to the difference in effective area between the opposite end faces thereof overcomes the load set on the pressure setting spring 22 and thus the control pistons $21_1$ and $21_2$ are driven inwardly toward each other. As the result, the ball valve elements $27_1$ $27_2$ are seated against the respective valve seats $25_1$ and $25_2$ to close the oil passage holes $26_1$ and $26_2$. Thereafter, as the control pistons $21_1$ and $21_2$ are further moved inwardly, the first and second output fluid chambers $d_1$ and $d_2$ are increased in volume and accordingly the fluid pressure in the downstream hydraulic chambers $b_1$ and $b_2$ and hence in the rear wheel brakes is reduced.

With further increase in output fluid pressure of the brake master cylinder M, the pressure in the input fluid chambers $c_1$ and $c_2$ is increased this time to force the control pistons $21_1$ and $21_2$ outwardly. In this manner, the ball valves $27_1$ and $27_2$ are again opened under the action of the respective valve opening rods $29_1$ and $29_2$ and the fluid pressure in the output fluid chambers $d_1$ and $d_2$ is raised. When this pressure reaches a definite level, it actuates the control pistons $21_1$ and $21_2$ again axially inwardly and is accordingly reduced. With repetition of such operation, the brake fluid pressure in each of the rear wheel brakes Br and Br' varies along the flexed line A in FIG. 4. The point of inflexion $p$ is determined by the initial load set on the pressure setting spring 22 and the rate of pressure rise after the point of inflexion $p$ has been reached is determined by the ratio of the effective area of one end face of control pistons $21_1$, $21_2$ to that of the other end face thereof.

In this connection, the point of inflexion $p$ is obtainable coincidently for both the left and right rear wheel brakes since the pressure setting spring 22 naturally exerts on the control pistons $21_1$ and $21_2$ biasing forces which are equal to each other in magnitude to each other and opposite in direction. Further, in cases where there exists more or less difference in pressure between the first and second input fluid chambers $c_1$ and $c_2$, the balance piston 24 is moved under the pressure difference immediately to establish pressure balance between the two fluid chambers $c_1$ and $c_2$. This means that the fluid pressures in the right and left wheel brakes can be held at all times equal to each other.

Figure 5:
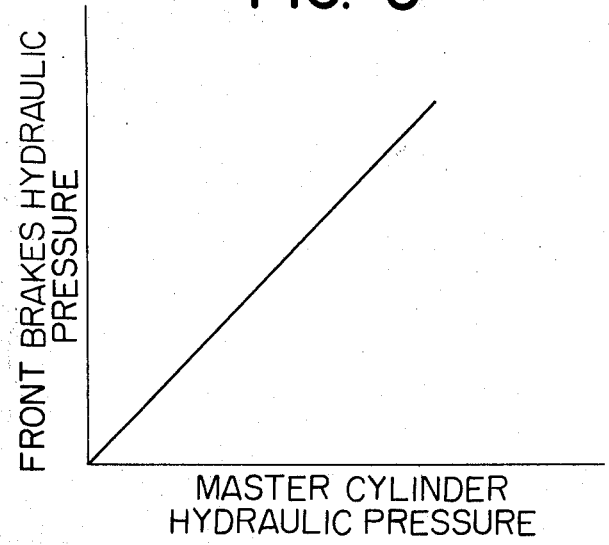
FIG. 5 illustrates the hydraulic pressure characteristics obtainable at the front wheel brakes.

On the other hand, the front wheel brakes $Bf$ and $Bf'$ are directly subjected to the output fluid pressure of the brake master cylinder M; that is to say, the fluid pressure in the front wheel brakes is held at all times equal to the output fluid pressure of the brake master cylinder M, as illustrated in the diagram of FIG. 5. Incidentally, the pressure equalizing function described above of the balance piston 24 again renders the fluid pressures in the right and left front wheel brakes equal to each other.

Accordingly, with the device of the present invention, the front wheel brakes $Bf$ and $Bf'$ can work forcefully upon the front wheels, which are subjected to an increasing downward load as the vehicle is tilted forwardly under the effect of heavy braking operation, while the rear wheel brakes $Br$ and $Br'$ work relatively lightly upon the rear wheels, which are more or less relieved of the downward load with the forward tilt of the vehicle. In this manner, all the four wheels of the vehicle can be braked as a whole with a maximized efficiency without the danger of any skidding.

Further, in such normal braking operation, since the fluid pressures in the first and second downstream hydraulic chambers $b_1$ and $b_2$ as well as in the first and second upstream hydraulic chambers $a_1$ and $a_2$ are held equal to each other, the first and second annular pistons $6_1$ and $6_2$ and balance piston 8 remain in their initial state with the switch actuator rod 16a received in the annular groove 15 in the balance piston 8, and the switch unit 16 is held open to maintain the alarm 17 inoperative.

However, if one of the two control pistons $21_1$ and $21_2$, for example, the second control piston $21_2$, is held stuck or otherwise malfunctioning to leave open the ball valve $27_2$, the pressure fluid from the second input fluid chamber $c_2$ is allowed to flow into the second output fluid chamber $d_2$ without any substantial reduction in pressure and thus the pressure in the second downstream hydraulic chamber $b_2$ is raised to a much greater extent than that in the first downstream hydraulic chamber $b_1$. As the result, the balance piston 8 is moved to the left, leaving the second annular piston $6_2$ in its normal position, and the switch actuator rod 16a is driven radially outwardly under the thrust of the sloped side wall of the annular groove 15 formed in the balance piston 8 so that the electric circuit 19 is closed to operate the alarm 17.

Now assume that a fluid leakage occurs during the braking operation in the first hydraulic line $L_1$. In this case, naturally no fluid pressure is developed in the first upstream and downstream hydraulic chambers $a_1$ and $b_1$ so that the balance piston 8 is driven to the left as with the case described above under the fluid pressure from the second hydraulic line $L_2$ and again the alarm 17 is operated. As the balance piston 8 reaches the left limit of movement, the second sealing member $10_2$ thereon is brought opposite to the adjacent annular groove $12_2$, leaving the adjacent peripheral wall surface of the cylinder bore 4, so that the second upstream and downstream hydraulic chambers $a_2$ and $b_2$ are placed in fluid communication with each other by way of the annular groove $12_2$. In this manner, the fluid pressure directed from the brake master cylinder M to the second hydraulic line $L_2$ and reaching the second upstream hydraulic chamber $a_2$ is allowed to pass directly into the adjacent downstream hydraulic chamber $b_2$.

Figure 4:
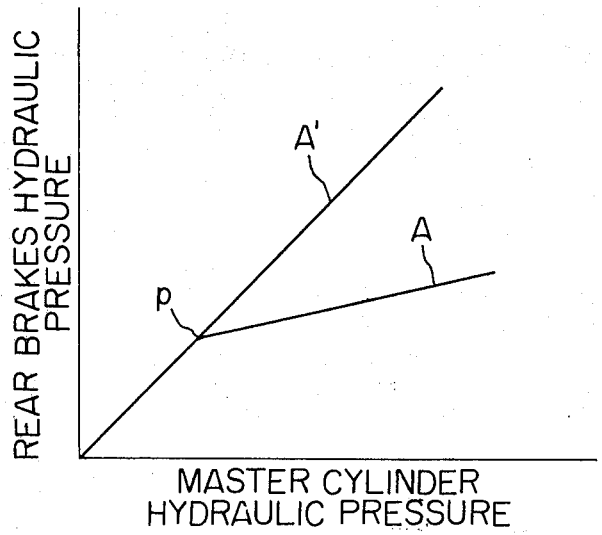
FIG. 4 is a graphic representation of the hydraulic pressure characteristics obtainable at the rear wheel brakes according to the present invention.

The fluid pressure developing in the rear wheel brake $Br'$, in this case, traces the straight line $A'$ in FIG. 4 and thus any extreme reduction in overall braking efficiency can be avoided despite failure of the other rear wheel brake $Br$ to operate.

Similarly, in the event that the first control piston $21_1$ fails to serve the intended pressure-reducing function or fluid leakage takes place in the second hydraulic line $L_2$, the balance piston 8 is caused to move to the right and substantially the same overall result obtained.

Once the balance piston 8 has reached its extreme left or right position, it remains in such position due to the frictional drag of sealing members 7, $10_1$ and $10_2$ to keep the alarm 17 in operation even after the brake master cylinder M is de-energized. Subsequently, when the brake master cylinder M is again actuated after the failure in the system has been remedied, the first and second annular pistons $6_1$ and $6_2$ subjected to fluid pressures of the same level developing in the first and second upstream hydraulic chambers $a_1$ and $a_2$ are driven axially inwardly toward the position defining member 5 to restore the balance piston 8 to its neutral position through the intermediary of abutting rings 9, which are fixed to the balance piston 8 and which the respective annular pistons $6_1$ and $6_2$ are placed in abutting engagement. Accordingly, the switch actuator rod 16a again enters into the annular groove 15 and the alarm 17 is rendered inoperative, indicating that now there exists no pressure or other failure in the whole hydraulic system.

It will be appreciated from the foregoing that, according to the present invention, the brake fluid pressure in the left and right wheel brakes $Br$ and $Br'$, respectively connected with the first and second mutually independent hydraulic lines $L_1$ and $L_2$, is normally reduced at a prescribed ratio with respect to that in the front wheel brakes $Bf$ and $Bf'$ so that all the four wheels of the vehicle are subjected to respective braking forces corresponding to the load levels imposed thereon so as to be braked with maximized efficiency. Further, not only in cases where fluid leakage occurs on one or the other of the two hydraulic lines $L_1$ and $L_2$ connected to the respective rear wheel brakes $Br$ and $Br'$ but also in cases where one or the other of the first and second control valves $30_1$ and $30_2$ fails to serve the function of controllably reducing the hydraulic pressure as applied to the rear wheel brakes $Br$ and $Br'$, the alarm 17 is operated without fail so that the driver can be warned during drive of any such trouble in the brake system without delay and without necessitating any complicated arrangement therefor. Further, it is to be appreciated that, in cases of fluid leakage on one or the other of hydraulic lines $L_1$ and $L_2$, the upstream and downstream hydraulic chambers connected with the normally functioning hydraulic line are placed in fluid communication with each other so that the rear wheel brake associated therewith can be fed with hydraulic pressure free from any reduction effect of the control valve $30_1$ or $30_2$ and, despite the fluid leakage present, there is obtained an overall braking efficiency sufficient to ensure driving safety.

While one preferred form of the device of the present invention has been shown and described, it will be apparent to those skilled in the art that many changes and modifications may be made therein without departing from the spirit of the invention or the scope of the appended claims.

What is claimed is:

1. In a vehicle brake system of the type including a dual brake master cylinder having a first and a second independent output port and a first and a second hydraulic fluid line extending from said respective first and second output ports of said brake master cylinder and connected to the respective hydraulic fluid chambers of a pair of left and right rear wheel brakes, a fluid pressure control device with a failure alarm comprising: a casing arranged across said first and second hydraulic fluid lines midway thereof and defining a cylinder bore; a pair of first and second annular pistons slidably fitted in said cylinder bore; a position defining member arranged on said casing to extend into the middle portion of said cylinder bore to define a minimum axial distance between said annular pistons; a balance piston extending axially through said annular pistons in sliding relation thereto and having a central portion formed to be embraced by said annular pistons; a pair of sealing members fixedly mounted on the opposite end portions of said balance piston so as to define in said cylinder bore a first and a second pair of upstream and downstream hydraulic chambers in cooperation with said balance piston as assuming a neutral position embraced by said annular pistons, said upstream and downstream hydraulic chambers in said first pair respectively communicating with the upstream and downstream portions of said first hydraulic fluid line, said upstream and downstream hydraulic chambers in said second pair respectively communicating with the upstream and downstream portions of said second hydraulic fluid line; means for placing said upstream and downstream hydraulic chambers in each pair in communication with each other as said balance piston assumes an end position remote from such hydraulic chambers; a first and a second control valve arranged between said first pair of upstream and downstream hydraulic chambers and between said second pair of upstream and downstream hydraulic chambers, respectively, and each operable to reduce the fluid pressure in said downstream hydraulic chamber relative to that in said upstream hydraulic chamber at a predetermined ratio; a switch unit mounted on said casing and operable in response to axial displacement of said balance piston from the neutral position thereof to operate an external alarm; said first and second control valves comprising: a second cylinder bore formed in said casing separate from and in parallel with the first-mentioned cylinder bore, a pair of first and second control pistons slidably fitted in said second cylinder bore, a first and a second input fluid chamber respectively defined on the inner ends of said first and second control pistons in fluid communication with said respective upstream hydraulic chambers in said first cylinder bore, a first and a second output fluid chamber respectively defined on the outer ends of said first and second control pistons in fluid communication with said respective downstream hydraulic chambers in said first cylinder bore and imparting to said first and second control pistons an area of fluid thrust larger than that imparted thereto by said first and second input fluid chambers, a first and a second valve element arranged between said first input and output fluid chambers and between said second input and output fluid chambers, respectively, so as to be positioned to intercommunicate the adjacent input and output fluid chambers as the associated control piston is moved to the outer end position thereof and to break communication between the adjacent input and output fluid chambers as the associated control piston is moved to the inner end position thereof, and a pressure setting spring arranged under compression between said first and second control pistons; a second balance piston arranged axially in said second cylinder bore, said first and second control pistons being formed in their respective inner end faces with axial bores to define therein said first and second input fluid chambers with the opposite end portions of said second balance piston slidably fitted in said respective axial bores.

* * * * *